W. PEARSON.
Car Spring.

No. 97,685.  Patented Dec. 7, 1869.

UNITED STATES PATENT OFFICE.

WILLIAM PEARSON, OF WINDSOR LOCKS, CONNECTICUT.

IMPROVED SPRING.

Specification forming part of Letters Patent No. 97,685, dated December 7, 1869.

*To all whom it may concern:*

Be it known that I, WILLIAM PEARSON, of Windsor Locks, in the county of Hartford and State of Connecticut, have invented a new and useful Improvement in Combined Springs, of which the following is a full, clear, and exact description, reference being had to the accompanying drawings, forming a part of this specification, and in which—

Figure 1:
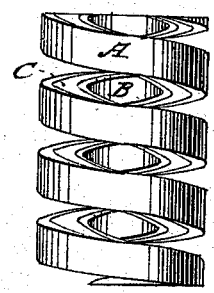
Figure 2:
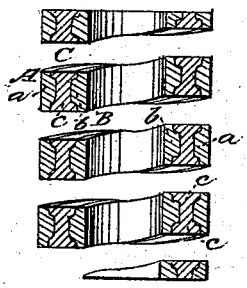

Figure 1 represents a view of a combined spring constructed in accordance with my improvement, and Fig. 2 a longitudinal section of the same.

Similar letters of reference indicate corresponding parts.

My improvement relates to that description of combined springs applicable as car-springs, and for other purposes, in which a spiral spring is arranged within a spiral spring, or any number of springs so combined to form a nest of springs distinct from each other, though operating in concert. Heretofore such combined springs have been irregular in their action, owing to unavoidable inequality in the liveliness of the springs making up the nest, or inequality or irregularity at points in the temper of the springs, which causes greater strain to be thrown upon the one spring than the other, and endangers breakage. To remove this objection without destroying the separate arrangement and free or independent action (to a limited degree) of the springs is the object of my invention, which consists in a peculiar connection of the springs throughout their length, or portions of their length, whereby a lively spring is made to assist or start a sluggish one, that only needed a starting influence to give to it its natural or quick and full action.

Referring to the accompanying drawings, the combined spring there represented is shown as made up of three spiral metallic springs, A, B, and C; but, of course, any number of springs may be used in the nest. These springs I form with spirally-arranged tongues and grooves throughout their length, or portions of their length, or otherwise equivalently connect them, so that in case of a spring sticking or not "coming up to time" it will be started or assisted by one of the other and more lively springs, at the same time not being bound by it, as regards independent action, to a limited degree, when started, by reason of a proper clearance being left between the springs and the connections referred to, allowing of independent spiral action. Where three springs are used, as shown in the drawings, the outer spring, A, may be made with a spiral tongue, $a$, on its inner surface, the inner spring, B, with a similar tongue, $b$, on its outer surface, and the middle spring, C, with spiral grooves $c\ c$ on its inside and outside surfaces, for the tongues $a\ b$ to loosely or freely fit. Such tongues and grooves or connections need not be continuous, or be carried throughout the lengths of the springs. Thus they may only extend for a given distance from either end, and their shape or arrangement may be variously modified, according to the number of springs in the nest, and other circumstances.

What is here claimed, and desired to be secured by Letters Patent, is—

A combined or combination spring made up of a series of spiral springs connected by tongues and grooves to act in unison, yet free to operate separately in a limited degree, substantially as specified.

WM. PEARSON.

Witnesses:
WM. M. ASHLEY,
WM. S. LARKUM.